No. 795,142.                                                             Patented July 18, 1905.

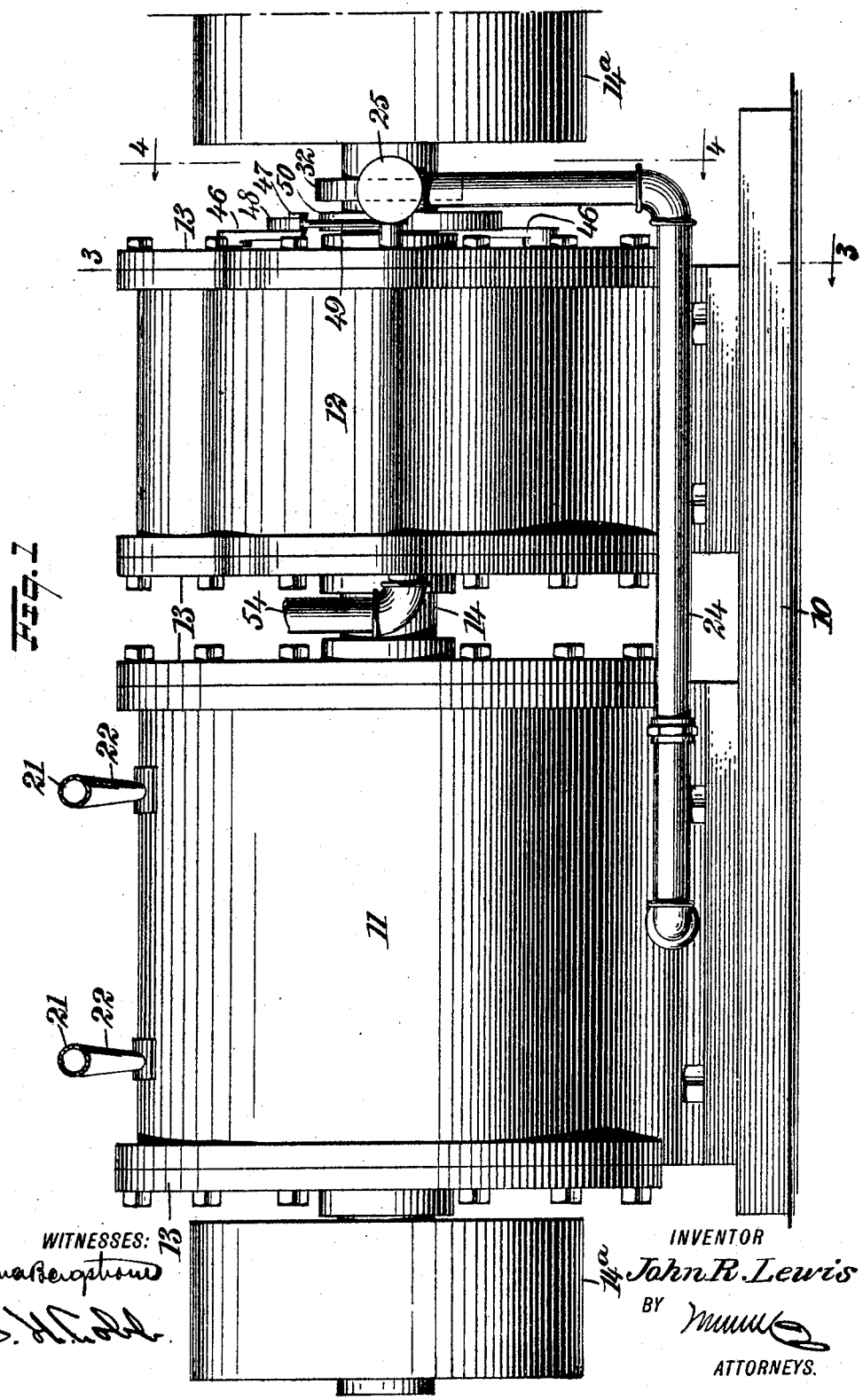

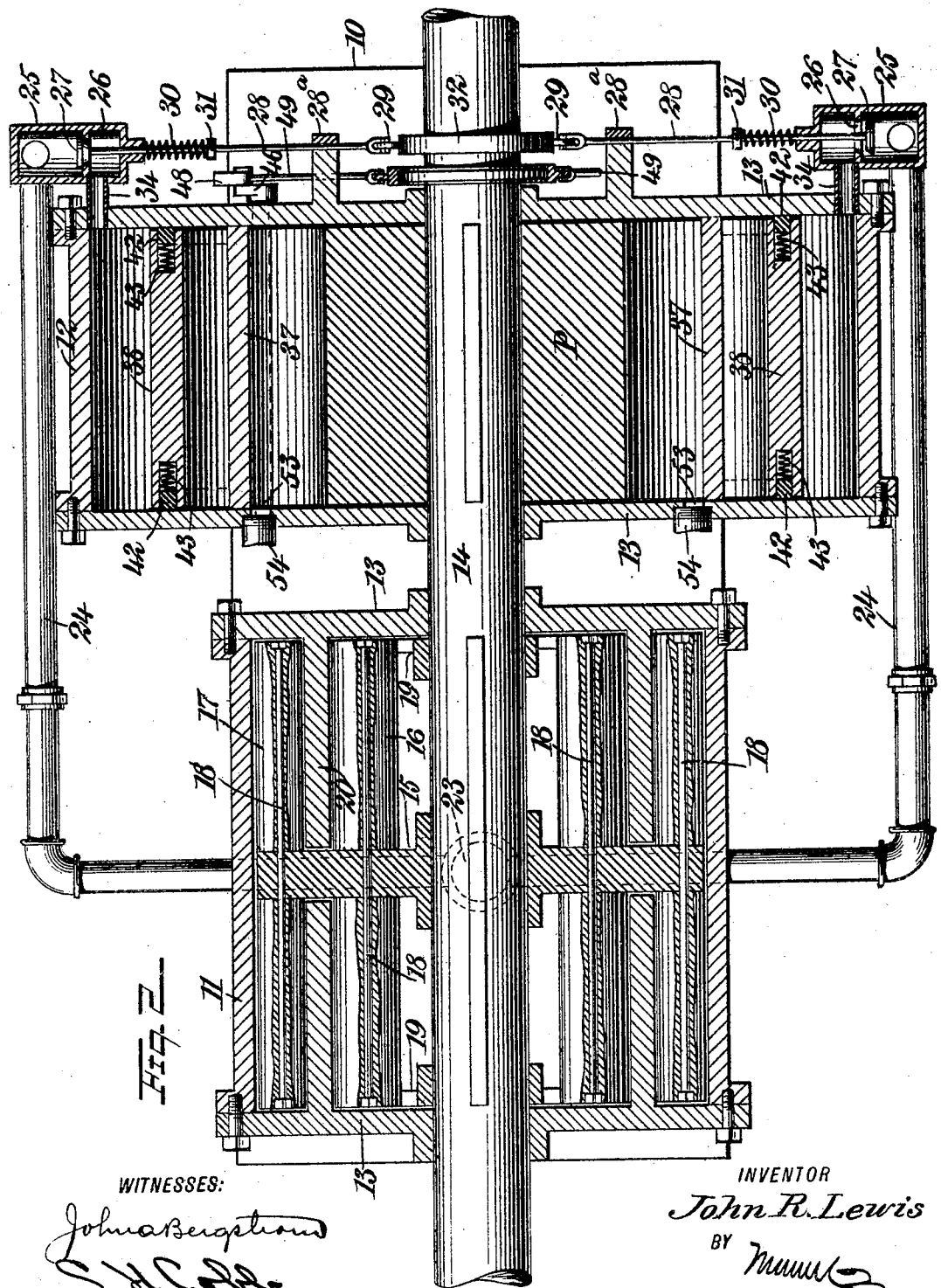

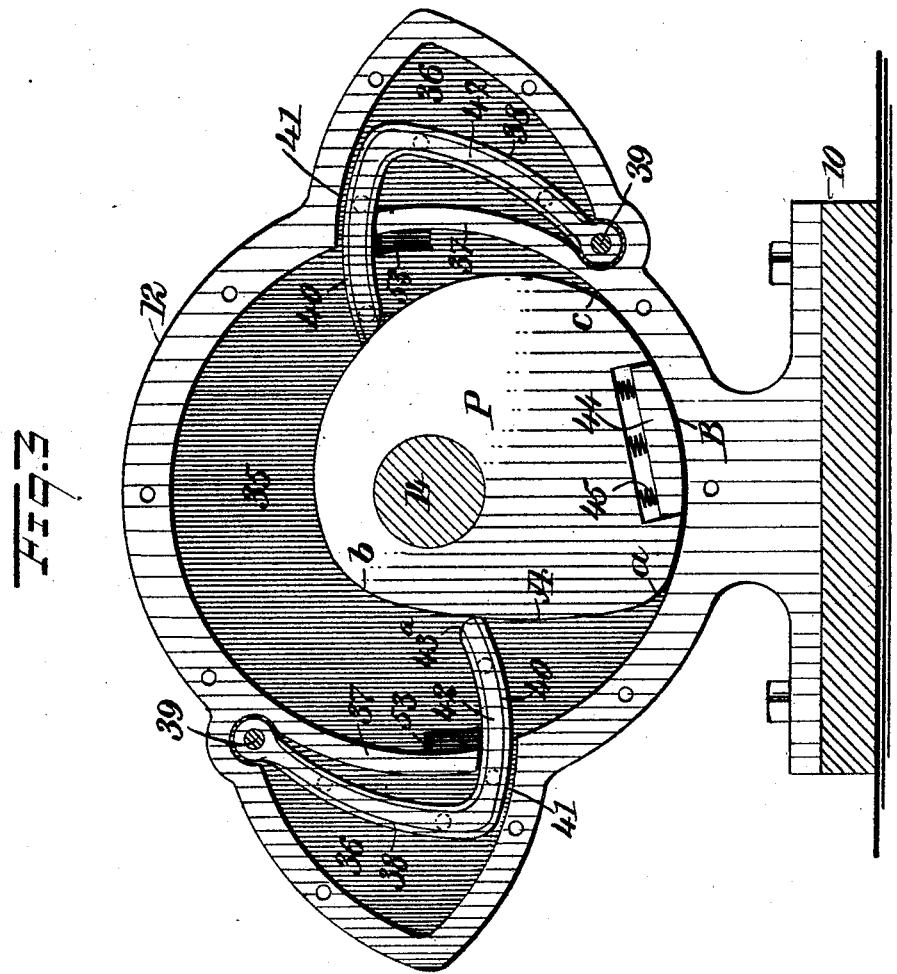

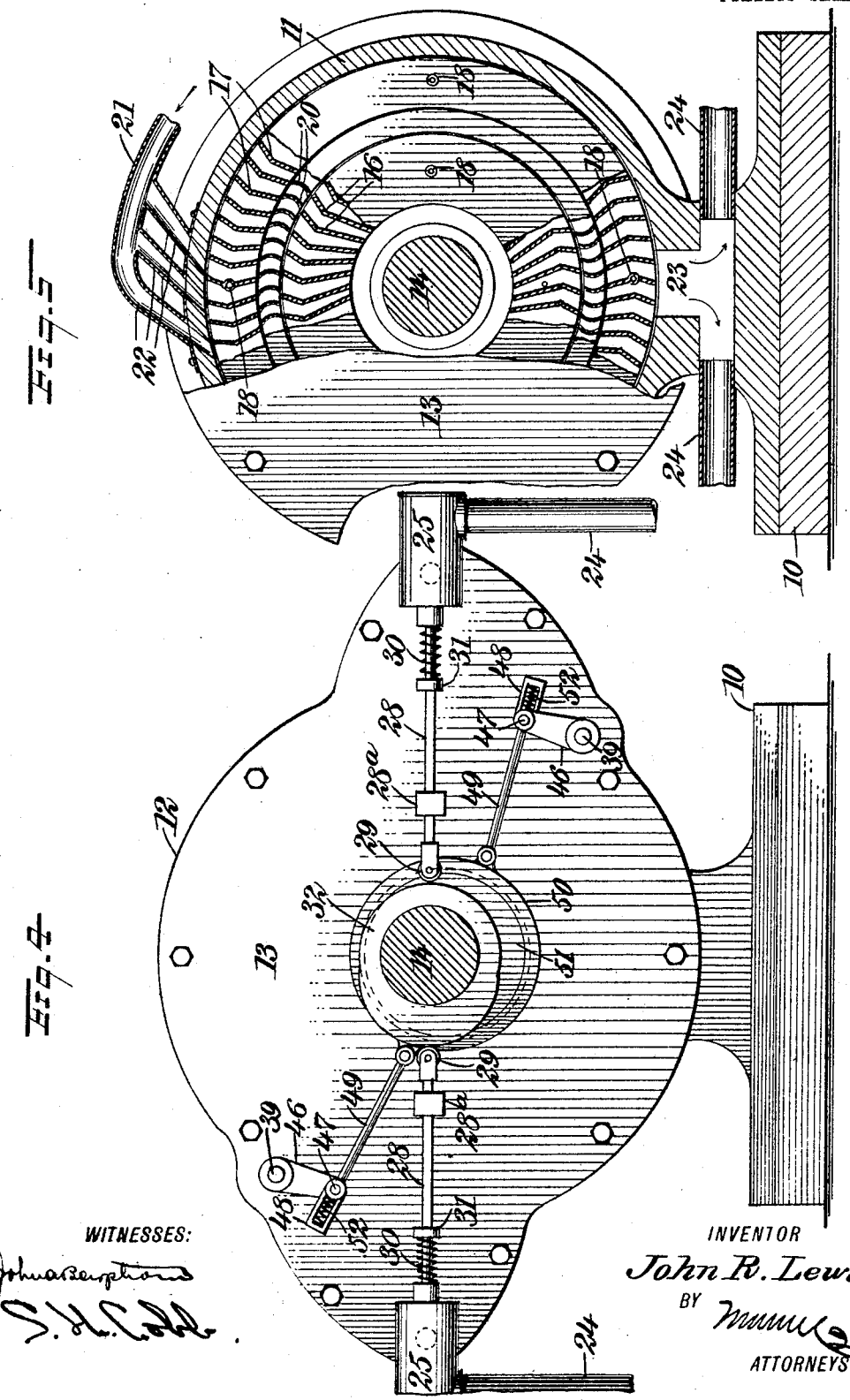

UNITED STATES PATENT OFFICE.

JOHN ROWE LEWIS, OF JERSEY CITY, NEW JERSEY.

ROTARY ENGINE.

SPECIFICATION forming part of Letters Patent No. 795,142, dated July 18, 1905.

Application filed November 22, 1904. Serial No. 233,835.

*To all whom it may concern:*

Be it known that I, JOHN ROWE LEWIS, a citizen of the United States, and a resident of Jersey City, in the county of Hudson and State of New Jersey, have invented a new and Improved Rotary Engine, of which the following is a full, clear, and exact description.

My invention relates to engines, and more particularly to those of the rotary type. Its principal objects are to provide a simple and efficient engine.

Reference is to be had to the accompanying drawings, forming a part of this specification, in which similar characters of reference indicate corresponding parts in all the views.

Figure 1 is a side elevation of one embodiment of my invention. Fig. 2 is a central horizontal section therethrough. Fig. 3 is a vertical transverse section on the line 3 3 of Fig. 1. Fig. 4 is a similar view on the line 4 4 of Fig. 1, and Fig. 5 is a broken sectional elevation looking from the left in Fig. 1.

10 designates a base upon which is supported a casing, here shown as being in two separate sections 11 and 12. Each of these sections has opposite heads 13 13, in which is journaled a shaft 14, carrying suitable pulleys 14$^a$ for transmitting the power generated.

Keyed to the shaft within the casing-section 11 is a central disk or spider 15, upon the opposite sides of which are sets of inner and outer blades 16 and 17, respectively, secured in place by bolts 18, extending through them and through the spider. The inner sets of blades may also be supported by spiders 19 19, keyed to the shaft. The blades have oppositely-inclined arms converging at a rather obtuse angle, the inner arms of the inner blades being shown as longer than the others. Between the sets of blades is mounted a circular series of reaction-blades 20, inclined in the opposite direction to the shaft-blades, they being preferably curved.

An expansible fluid—steam, for example—is introduced into the casing-section 11 by pipes 21, which may be two in number, entering the casing at points substantially midway of the blades upon each side of the central spider through a plurality of nozzles 22, of which there may be three for each of the pipes. These nozzles are arranged in succession peripherally of the casing and are inclined to deliver the fluid at an acute angle against the outer arms of the outer revoluble blades. At the opposite side of the casing 11 from these inlet-nozzles is an outlet or exhaust opening 23, from which pipes 24 24 lead to valve-casings 25 25, supported upon opposite sides of the casing-section 12. In each of these casings is a seat 26, with which coöperates a valve 27, carried by a rod 28. These rods are guided by brackets 28$^a$, projecting from the casing-head, and have upon their inner ends rolls 29, which are forced by springs 30, situated between the valve-casing and collars 31, against a cam 32, fast upon the shaft 14. From the casings pipes 34 deliver to inlet-openings at opposite extremities of the section 12. This casing-section is in three parts, comprising a generally cylindrical central chamber 35, at the sides of which are generally triangular chambers 36 36, to the outer apices of which the pipes 34 deliver. The chambers 36 are separated from the central chamber by partitions 37, extending for the full length of the section, but having openings at one end. In each of these chambers 36 operates a movable angular abutment, consisting of an arm 38, mounted upon a shaft 39, journaled in the casing-heads and having an arm 40 extending through the opening at the end of the partition 37 into the central chamber, there being left between the arm 40 and the casing-wall a contracted space 41. Each abutment extends for substantially the full width of the casing and has along its opposite edges packing-strips 42, held in contact with the inner walls of the heads by springs 43, thus insuring tight joints. Each of the arms 40 may be inclined at its inner end at 43$^a$, where it contacts with a rotatable piston P, mounted eccentrically upon the shaft 14. The length of this piston is such as to fill the chamber transversely, the ends being suitably packed, if desired. The piston is flattened peripherally at one portion A, this extending between somewhat sharply rounded portions *a* and *b*. From *a* to *c* is a concentric portion B, operating in close proximity to the wall of the chamber 35 and preferably carrying a packing-strip 44, which may be kept in contact with said wall by springs 45. From c to b the periphery of the piston is gradually curved in a generally spiral form.

To maintain the ends of the abutments in contact with the periphery of the piston, while not depending upon this to move them, each of the shafts 39 has secured at its outer end a crank-arm 46, a pin 47 upon which projects through a loop 48 upon an arm 49, which is pivoted at its opposite extremity to a strap 50, surrounding an eccentric 51. As the piston is not of circular form, this eccentric will not permit the abutments to exactly follow its contour, and to effect this and to insure the abutments being always in contact with the piston a spring 52 is interposed between the outer end of each loop and the crank-pin, its pressure forcing the abutment inwardly.

Through the inner head of the casing-section 12, at the juncture of each of the partitions 37 and the abutment-arm 40, is an exhaust-port 53, somewhat elongated circumferentially of the piston-chamber and having leading from it, if desired, a pipe 54.

In use steam or other fluid is admitted through the nozzles into the casing-section 11 and is projected against the outer arms of the blades 17. These deflect it against the inner arms, each impact producing rotative effect. It then flows between the reaction-blades and against the revoluble blades 16, which receive two more impacts. After leaving the inner arms of these last-named blades it flows across the space surrounding the shaft and acts successively upon the blades 16 and 17 in a similar manner. Having reached the outlet-opening, it passes through the pipes 24 into the valve-casings. One of these is now opened by a projecting portion of the cam 32 admitting the fluid to the abutment-chamber. At this time the portion a of the piston P is just passing the end of the abutment within that chamber, and as it comes into coaction with the surface A the expansion of the steam forces the abutment against this portion. This imparts rotation to the piston, and at the same time the fluid flows through the contracted opening into the space formed between the piston-abutment and casing-wall and there exerts its expansive force against the piston, increasing the rotative effect. The action of the fluid both upon the abutment and piston is thus transmitted to the shaft and its force added to the impact force of the fluid in the casing-section 11. At a suitable time, this depending upon the fluid-pressure employed and being controlled by the contour of the cam, the valve cuts off the supply and expansion continues until the piston uncovers the outlet-port 53, whereupon exhaust into the atmosphere occurs. When this exhaust has been fully effected, the portion a of the piston reaches the opposite abutment, and at this time admission begins through the other valve, the operations being repeated in the same manner to complete a cycle. It will be seen that in this way both the impact and expansive force of the steam are utilized. If the apparatus is to be employed as an internal-combustion engine, the supply may be to the casing-section 12, the exhaust from which is delivered to the section 11. In this manner not only is the impact of the exhaust applied to the rotating of the shaft, but a muffling effect is also secured in its passage between the blades with comparatively little back pressure.

Having thus described my invention, I claim as new and desire to secure by Letters Patent—

1. An engine comprising a casing having an abutment-chamber in which is an inlet-opening and a piston-chamber in which is an outlet-opening, a piston rotatable in the piston-chamber and having a portion of its periphery flattened, an angular abutment having one arm movable in the abutment-chamber and an arm extending into the piston-chamber for coaction with the periphery of the piston, and rotatable means for moving the abutment with respect to the piston.

2. An engine comprising a casing having an abutment-chamber in which is an inlet-opening and a piston-chamber in which is an outlet-opening, a piston rotatable in the piston-chamber and having a portion of its periphery flattened, an angular abutment having one arm movable in the abutment-chamber and an arm extending into the piston-chamber for coaction with the periphery of the piston, a shaft situated within the abutment-chamber upon which the abutment-arm is fixed, a rotatable operating member, and yieldable means for connecting the operating member and shaft.

3. An engine comprising a casing having an abutment-chamber in which is an inlet-opening and a piston-chamber in which is an outlet-opening, a piston rotatable in the piston-chamber and having a portion of its periphery flattened, an angular abutment having one arm movable in the abutment-chamber and an arm extending into the piston-chamber for coaction with the periphery of the piston, a shaft situated within the abutment-chamber upon which the abutment-arm is fixed, a crank-arm secured to the shaft, an eccentric and its strap, a rod projecting from the eccentric-strap, and a yieldable connection between the rod and crank-arm.

4. An engine comprising a casing having an abutment-chamber in which is an inlet-opening and a piston-chamber in which is an outlet-opening, a piston rotatable in the piston-chamber and having a portion of its periphery flattened, an angular abutment having one arm movable in the abutment-chamber and an arm extending into the piston-chamber for coaction with the periphery of the piston, a shaft situated within the abutment-chamber upon which the abutment-arm is fixed, a crank-arm secured to the shaft, a pin projecting from the crank-arm, an eccentric and its strap, a rod projecting from the eccentric-strap and having a loop into which the pin extends, and a spring interposed between the pin and the end of the loop.

In testimony whereof I have signed my name to this specification in the presence of two subscribing witnesses.

JOHN ROWE LEWIS.

Witnesses:
   Jas. H. Clark,
   Thomas Towell.